United States Patent [19]
Touzeau

[11] Patent Number: 6,006,102
[45] Date of Patent: Dec. 21, 1999

[54] TELECOMMUNICATION DEVICE COMPRISING A BASE STATION AND AT LEAST ONE MOBILE STATION HAVING A PARTICULAR INTERCOM MODE, AND METHOD OF STARTING THIS MODE

[75] Inventor: Patrick Touzeau, Le Mans, France

[73] Assignee: U.S. Philips Corporation, New York, N.Y.

[21] Appl. No.: 08/980,132

[22] Filed: Nov. 26, 1997

[30] Foreign Application Priority Data

Dec. 6, 1996 [FR] France ..................................... 96 15047

[51] Int. Cl.$^6$ ...................................................... H04M 1/72
[52] U.S. Cl. .......................... 455/517; 455/575; 455/569; 379/159; 340/825.06
[58] Field of Search ............................... 455/66, 414, 416, 455/422, 462, 463, 464, 550, 560, 575, 569; 379/159; 370/278, 296; 340/825.06, 311.1

[56] References Cited

U.S. PATENT DOCUMENTS 4,882,746 11/1989 Shimada ...................................... 379/61
5,140,628 8/1992 Murata et al. ............................. 379/61

Primary Examiner—Wellington Chin
Assistant Examiner—Pablo N. Tran
Attorney, Agent, or Firm—Dicran Halajian

[57] ABSTRACT

In the microprocessor assembly of the base station (51) and of the mobile station of a wireless telephony device, a reduced-intercom mode is implanted intended for sound monitoring, which mode, once it is started from the base station (52), brings about the succession of the following events (53):

reception in the mobile station by radio channel of the instruction to install in the reduced-intercom mode consisting of the inhibition of the ringing, the switching on of its microphone, the switching off of its loudspeaker and the automatic calling of the base station to cause the latter to switch on the loudspeaker and switch off the microphone, so as to establish an automatic calling of the mobile station from the base station (54).

5 Claims, 2 Drawing Sheets

TELECOMMUNICATION DEVICE COMPRISING A BASE STATION AND AT LEAST ONE MOBILE STATION HAVING A PARTICULAR INTERCOM MODE, AND METHOD OF STARTING THIS MODE

FIELD OF THE INVENTION

The invention relates to a telecommunication device comprising a first part called base station and at least one second part called mobile station, between which parts it is possible to establish an intercom mode by radio in addition to the main use of the device in the telephone mode.

Such devices known as wireless telephony devices are currently used and provide ease of use to the users because of the number of functions and function modes they offer to their users.

With a mobile station, which is a handset comprising a transceiver antenna, a keyboard also comprising various keys for specific functions and, in most cases, a screen permitting of displaying alphanumeric signs and icons, it is possible to handle incoming or outgoing calls in a range from 200 to 300 meters around the base station when the latter is in the telephone mode. By means of specific keys and the screen it is easy and highly ergonomic to choose and select this or that desired mode of operation such as, for example, the melody of the ringing tone, including the absence of ringing, if desired. This may simply be effected by the set of incrementations or decrementations in a main scrolling menu, after which this or that option is validated which may be followed by sub-menus in which one moves about by means of incrementations and decrementations and successive validations while the various options on the screen are watched going by. The base station is generally simpler, because it does not comprise the keyboard and only permits of receiving calls in the hands-free mode.

BACKGROUND OF THE INVENTION

In addition to the telephone function, the intercom function, which does not utilize the telephone network, permits two persons to have a conversation at a distance, one being close to the base station and the other one having the mobile station.

The invention proposes to adapt a wireless mobile plus base station for realizing a particular intercom mode for which it is possible to find specific equipment in the market: the invention is about a walkie-talkie type formed by a transmitter/receiver pair, which operates as an ordinary walkie-talkie, except for two details:

on the side of the transmitter, it continues to be connected, and on the side of the receiver, there is no return of sound to the transmitter.

This device forms a remote monitoring system, particularly useful notably for monitoring a baby that sleeps while the door of its room is closed, so that it is not disturbed by noise from the apartment. The transmitter station is placed in the room to be monitored; it captures ambient noise (the cries of the baby, possibly) and transmits it by radio several meters from there to a receiver station placed close to (or carried by) the babysitting person who is occupied with other business. Certain of these devices designated by the name Babysit in the following of the text are agreed by the government (Post Office), such as the Babysit of the American Fisherprice Company, whereas others are not. These Babysits operate in a frequency range that is also the range of certain wireless telephony devices, but on a single radio channel for each mobile station. This raises the drawback that this single channel may be disturbed by radio interference without there being a possibility of remedying same by searching for and utilizing another channel that is not disturbed. On the other hand, a Babysit has a reduced coverage area, only of the order of 100 meters. Furthermore, these devices have no other possible use than that for which they have been designed, not even the use of the conventional intercom mode.

SUMMARY OF THE INVENTION

It is an object of the invention to construct a wireless telephony device which operates and can be used in a reduced-intercom mode called Babysit mode. This object is achieved and the drawbacks of the prior art are mitigated due to the fact that the device mentioned in the opening paragraph is characterized in that it comprises in a first memory of the base station and in a second memory of the mobile station management means for generating a substitute for said intercom mode, the reduced-intercom mode which, when selected, can be activated from the base station or the mobile station, to induce the next state of the device:

in the part remote from the part where the activation takes place, switching off of the ringing, automatic transmission in the intercom mode, switching on of the microphone and switching off of the earphone, or the loudspeaker, respectively, in the part where the activation takes place, switching on of the loudspeaker or earphone respectively, and switching off of the microphone.

Preferably, since the mobile station is only to comprise a keyboard, it is from this mobile station that the programmation in the Babysit mode is made by means of the scrolling menu as described above, in a manner fully comparable with that of the choice of a ringing melody, for example. For this purpose, in a sub-mode of the category called "telephone configuration" and for example, after the sub-category called "melody selection", a sub-category called "selection of the intercom mode" is provided. The latter sub-category contains two modes which are: Intercom, which is the habitual intercom mode, and Babysit, which is the reduced-intercom mode. When the Babysit mode is selected by the depression of a validation key, this information is transmitted by radio to the base station which decodes this particular signal and, consequently, in its turn gets the configuration of the Babysit mode. It may be noted that the sequence that has just been described for the configuration of the assembly of the device in a given mode is already known and used for the choice of the dialling mode, for example, depending on whether one wishes the digit dialing or voice dialing.

These and other aspects of the invention will be apparent from and elucidated with reference to the embodiments described hereinafter.

DESCRIPTION OF PREFERRED EMBODIMENTS

Figure 1A:
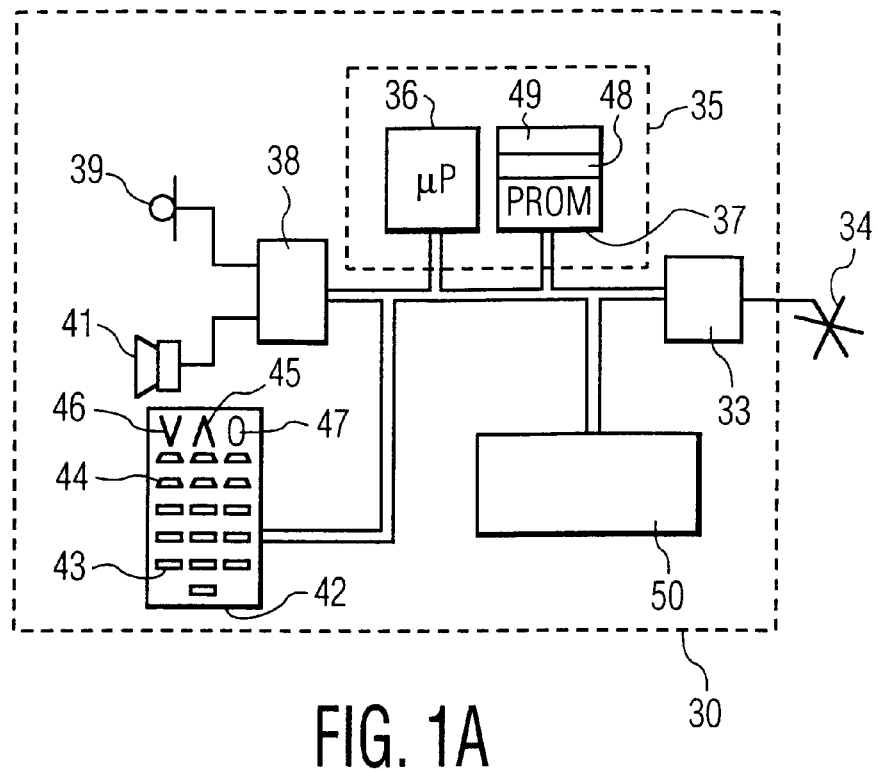
FIG. 1 represents a device according to the invention.
Figure 1B:
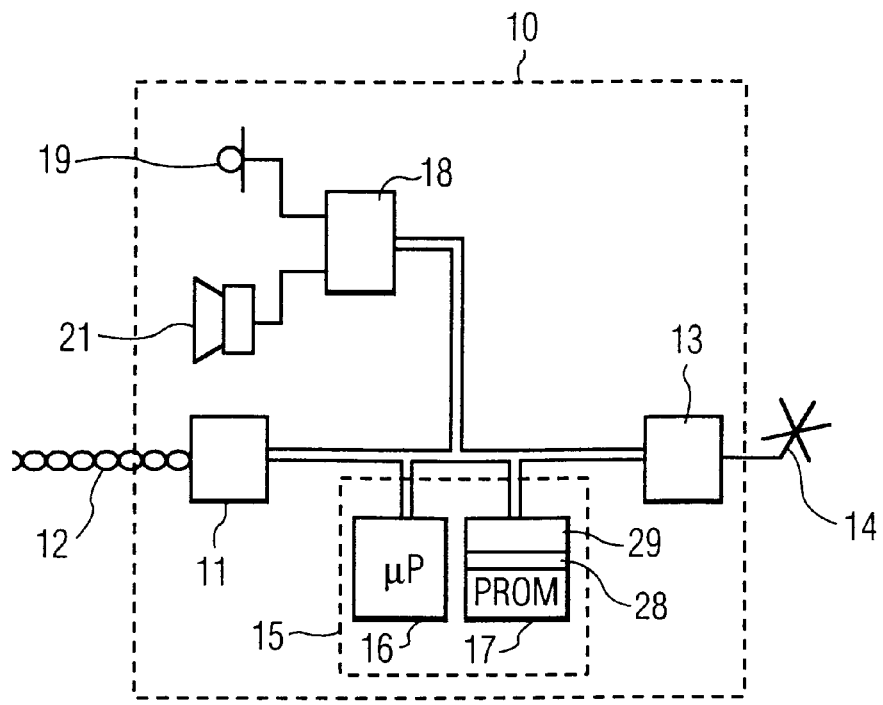

The device shown in FIG. 1 is a wireless telephony device, for example, of the type known by the name of CTO.

It is formed by a base station 10 and at least one mobile station (or mobile unit) 30 which form a first and a second part, respectively.

The base station 10 is formed by a connection circuit 11 for permitting of a connection to a telephone line 12. It is also formed by a transceiver circuit 13 coupled to an antenna 14 for communication with the various mobile stations connected thereto by radio, notably the mobile station 30. The base station 10 also comprises a microprocessor management assembly 15 which runs the instructions for utilizing, notably, the means according to the invention. This assembly 15 notably comprises the actual microprocessor 16 and a read-only memory 17. Furthermore, a voice circuit 18 to which is connected a microphone 19 and a loudspeaker 21 permits a user to speak in the hands-free mode in response to an incoming call either coming from the network through the line 12, or coming from a mobile station via the antenna 14. It is also possible to call the mobile station from the base station, which forms the intercom function, or intercom mode.

The mobile station 30 has a structure which is partly comparable to that of the base station 10: this relates to the elements 33, transceiver circuit; 34 transceiver antenna; 35 microprocessor management assembly comprising an actual microprocessor 36 and a ROM memory 37; 38 voice circuit to which are connected a microphone 39 and a loudspeaker 41 which is similar to loudspeaker 21 of the base station. The microprocessor management assembly 35 thus runs the instructions for notably utilizing the means according to the invention and ensures the operation of the mobile station 30.

The mobile handset 30 also comprises a keyboard 42 having a number of keys: keys such as 43, in essence intended for dialling a telephone number (white keys in FIG. 1), and keys such as 44 which permit of accessing this or that main function of the apparatus (black keys). Among the keys 44 are distinguished, for example, the key called: line access key and intercom/transfer key. One of the keys 44 is a menu key which permits of reaching this or that preselected operation mode (or option). Passing through the menu is realized by incrementation/decrementation by means of the keys 45 and 46, followed by a validation by a validation key 47, again followed by an incrementation/decrementation in a sub-menu until the chosen option is reached which one selects by depressing key 47. After this, one may go back to the standby mode of the mobile station by depressing again the "menu" key 44.

In the prior art, the intercom mode is a main function which, because of this, does not need to occur in the menu. According to the invention, an additional mode called Babysit is created which is a reduced-intercom mode. Thus a sub-menu is created for the intercom which has two options, that is to say: the Intercom mode and the Babysit mode, which will be explained hereinafter with reference to FIG. 2. The programs relating to the two intercom modes are contained in the read-only memory 17 at the locations 28 and 29 and in the read-only memory 37 at the locations 48 and 49 in the same way as other sub-menus, such as the choice of a melody for the ringing sound for example, or the choice of a dialling mode.

It will be noted, as has already been indicated above, that when the Babysit option is validated, by depressing key 47, this information is transmitted by radio to the base station which decodes this particular signal and, consequently, in its turn is configured to the Babysit mode which is a sequence already known for establishing other modes of operation of the device.

Figure 2:
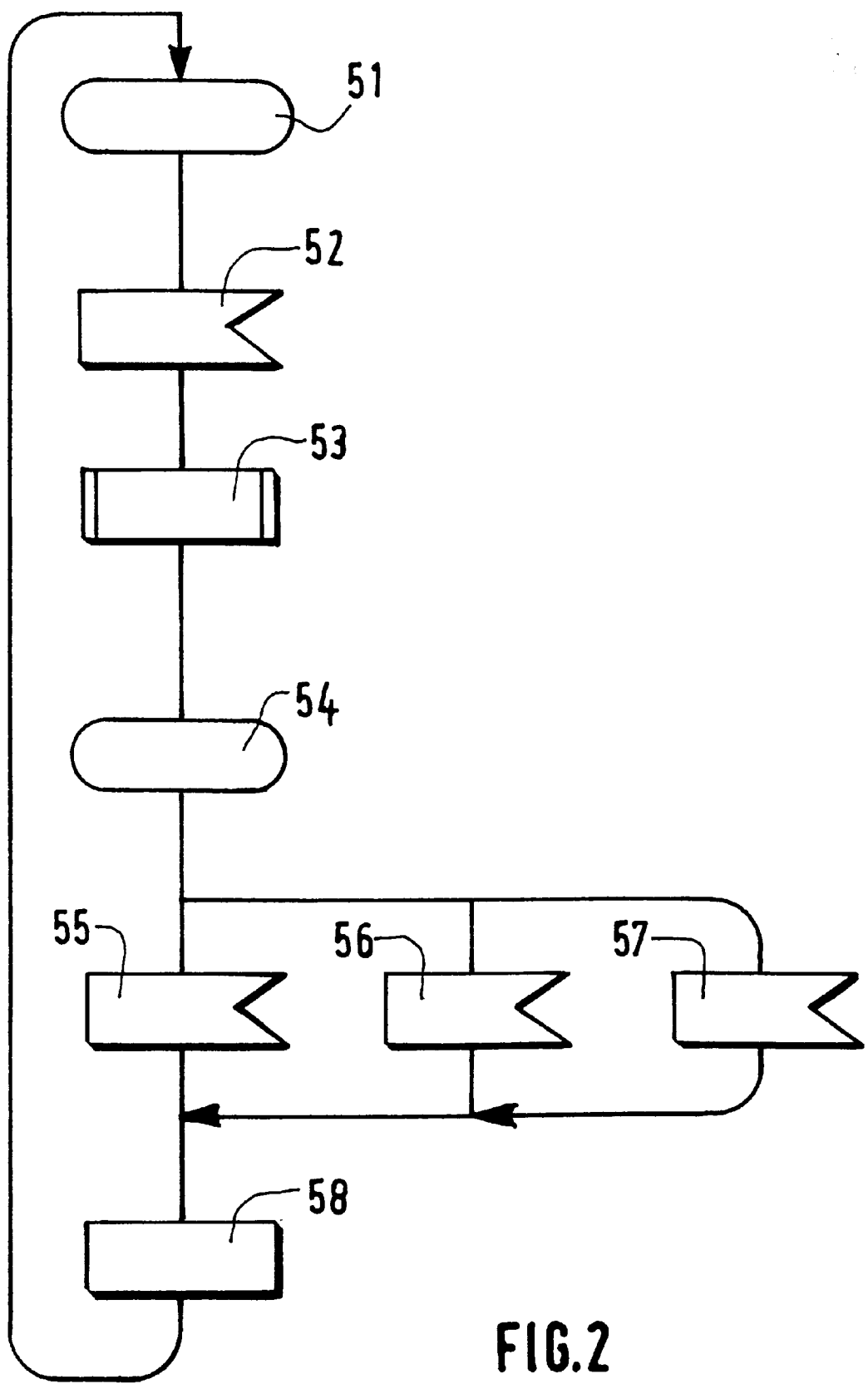
FIG. 2 is a diagram permitting of the explanation of the operation of the device according to the invention.

FIG. 2 shows in a diagram the functionalities which are to be realized in the form of a program by a person of ordinary skill in the art, then implanted in the microprocessor assembly 15 and 35 (FIG. 1) for implementing the invention, while the sought object is the capability of monitoring the noise in the room of a child without disturbing it.

In practice, there is supposed that the mobile handset in the state of rest is in the room of the child and that the Babysit mode is started from the base station located in another part of the house, while the two parts of the device have beforehand been programmed to the Babysit mode.

In block 51, the base station is in a state of rest. In 52 the Babysit mode is triggered by depressing the "intercom" key of the base station. In 53 the mobile station which receives the call:

inhibits the ringing,
automatically goes off-hook,
switches off its loudspeaker,
switches on its microphone.

Following the return call from the mobile station, the base station is activated by:

switching on its loudspeaker,
switching off its earphone.

Thus, a one-way link from the mobile station to the base station has been realized by remote control from the base station.

In 54, one is in the Babysit mode, the ambient noise of the chamber to be monitored being transmitted by the loudspeaker of the base station (of which the sound volume can be adjusted). In this situation one may optionally provide that if a call coming from the outside occurs when the Babysit function is active, the mobile station in the Babysit mode does not ring (only the base station rings) and that the Babysit function is interrupted. It is then possible to take the call on the base station or on the mobile station.

The blocks 55, 56 and 57 are parallel blocks and mark three different ways of interrupting the Babysit mode of operation.

In 55 one has reached a maximum imposed duration in the intercom mode by the regulations of the telecommunications. This duration, which is highly variable in the different countries is, for example, 15 minutes in France and two hours in the United States. The device automatically returns to the state of rest. Optionally, one may provide that a specific sound signal is transmitted by the base station, in this case for signaling the stop and, immediately afterwards, again the standby mode can be activated.

In 56 the interruption of the standby mode is activated by depressing the intercom key of the mobile station, or in 57 by depressing the intercom key of the base station. In block 58 the microphone and the loudspeaker of the base station are cut off, and so is the microphone and the earphone of the mobile station. Base station and mobile station go back to the state of rest (return to block 51).

It should be noted that during all the time of operation in the Babysit mode, an indicator light winks on the base station, this indicator light being permanently on when the base station is in the state of rest when fully charged, the winking of this indicator light further indicates in a more general sense any type of possible operation of the base station.

If the roles of the base and mobile stations are reversed, the base station being located in the room to be monitored, the mobile station somewhere else, and the standby mode is switched on from the mobile station, the activation mode of the two parts of the device is executed as described above, but in the order: mobile station—base station—mobile station and the functionalities indicated above are reversed between base and mobile stations, the handset of the mobile station replacing the loudspeaker of the base station; the stop of the monitoring is controlled by one of the three possibilities already indicated above with reference to FIG. 2.

When the device has a configuration so that the ringing facility can be switched off, particularly that of the mobile station, it is advantageous that this state is signaled visually, at least on the mobile station: either by means of an indicator light provided for this purpose (not shown), or, preferably, on a screen, for example a liquid crystal display as represented in 50 in FIG. 1. During the entire period in which the device is outlined in the reduced-intercom mode, it may be provided that on the screen 50, for example, the expression: Babysit is displayed, which additional measure must thus be provided and added to the Babysit program when initially implanted in the microprocessor assembly 35 of the mobile station.

For reverting to the intercom mode or Babysit mode software, the display on the screen 50 (FIG. 1) of the various headings and options of the menu successively obtained by incrementations and successive validations is very ergonomic. It will be noted that the sequence to be realized for passing from one intercom mode to the other mode is the same depending on whether this passing takes place in one or the other direction.

The invention is not restricted to the embodiments described above and many variants are possible.

In certain versions, the base station comprises a comparable keyboard to that of the mobile station and it thus becomes possible to outline the device, notably in the Babysit mode, from the base station.

The mobile station may also have a loudspeaker which can be switched to the earphone, and vice versa, in response to a key called "loudspeaker", in all the operating conditions for which the earphone is in operation, and notably in the Babysit mode when the mobile station is not located in the area to be monitored.

A wireless telephony device currently has various mobile stations; in this case only one of the mobile stations can operate in the Babysit mode from a physical point of view; it is thus not necessary for the mobile station(s) other than that (those) described above to have the Babysit mode in its (their) menu.

I claim:

1. A telecommunication device comprising a first part called base station and at least one second part called mobile station, between which parts it is possible to establish an intercom mode by radio, in addition to the main use of the device in the telephone mode, characterized in that it comprises in a first memory of the base station and in a second memory of the mobile station management means for generating a replacement of said intercom mode, the reduced-intercom mode which, when selected, can be activated from the base station or the mobile station, to induce the next state of the device:

in the part remote from the part where the activation takes place, switching off of the ringing, automatic transmission in the intercom mode, switching on of the microphone and switching off of the earphone, or the loudspeaker, respectively, in the part where the activation takes place, switching on of the loudspeaker or earphone respectively, and switching off of the microphone.

2. The telecommunication device as claimed in claim 1, in which said management means are formed by a first microprocessor assembly in said base station and a second microprocessor assembly in said mobile station.

3. A telecommunication device as claimed in claim 1, characterized in that said management means generate a specific sound signal from the base station when the maximum possible duration for the reduced-intercom mode has elapsed.

4. A telecommunication device as claimed in claim 1, characterized in that said mobile station comprises a specific light signal transmitter arranged for being activated by said management means during all the time when the device is arranged in the reduced-intercom mode.

5. An initialization method for initializing in the intercom mode a wireless telephony device comprising a base station and at least one mobile station, characterized in that the method comprises the following steps:

switching to the reduced-intercom mode from the base station by depressing the Intercom key, receiving by radio in the mobile station the command to configure the reduced-intercom mode which comprises inhibiting its ringing, switching on its microphone, switching off its loudspeaker and the automatic call of the base station to cause in the latter, the loudspeaker to be switched on and the microphone to be switched off.

\* \* \* \* \*